(12) United States Patent
Shum (10) Patent No.: US 7,350,209 B2
(45) Date of Patent: Mar. 25, 2008

(54) SYSTEM AND METHOD FOR APPLICATION PERFORMANCE MANAGEMENT

(75) Inventor: Annie Shum, Hopkinton, MA (US)

(73) Assignee: BMC Software, Houston, TX (US)

( * ) Notice: Subject to any disclaimer, the term of this patent is extended or adjusted under 35 U.S.C. 154(b) by 746 days.

(21) Appl. No.: 09/895,661

(22) Filed: Jun. 29, 2001

(65) Prior Publication Data

US 2003/0009507 A1 Jan. 9, 2003

(51) Int. Cl.
*G06F 9/46* (2006.01)
*G06F 15/173* (2006.01)
*G06F 3/00* (2006.01)
*G06F 3/048* (2006.01)
*G06F 15/00* (2006.01)
*G06F 15/76* (2006.01)
*G05B 19/418* (2006.01)

(52) U.S. Cl. .......................... 718/104; 709/226; 705/8; 715/738; 715/754; 715/763; 715/965; 715/966; 715/967; 712/28

(58) Field of Classification Search .................. 705/7, 705/1, 8; 710/52; 718/104; 709/223–226; 715/754, 738, 763, 965–967; 712/28
See application file for complete search history.

(56) References Cited

U.S. PATENT DOCUMENTS

| | | | | |
|---|---|---|---|---|
| 5,734,837 A | * | 3/1998 | Flores et al. .................. 705/7 |
| 5,815,152 A | * | 9/1998 | Collier et al. ................ 715/839 |
| 5,958,009 A | * | 9/1999 | Friedrich et al. .............. 709/24 |
| 5,958,010 A | * | 9/1999 | Agarwal et al. ............. 709/224 |
| 5,999,911 A | * | 12/1999 | Berg et al. ....................... 705/9 |
| 6,145,031 A | * | 11/2000 | Mastie et al. .................. 710/52 |
| 6,225,998 B1 | * | 5/2001 | Okita et al. ................... 715/853 |
| 6,714,976 B1 | * | 3/2004 | Wilson et al. ............... 709/224 |
| 2002/0173997 A1 | * | 11/2002 | Menard et al. ................. 705/7 |
| 2003/0004771 A1 | * | 1/2003 | Yaung ........................... 705/8 |

* cited by examiner

*Primary Examiner*—William Thomson
*Assistant Examiner*—Qing-Yuan Wu
(74) *Attorney, Agent, or Firm*—Wong, Cabello, Lutsch, Rutherford & Brucculeri, LLP (57) ABSTRACT

An improved method and system for complex and integrated application performance management which tracks end-to-end computer resource consumption of a first business application workflow in an enterprise system. The first business application workflow may include a plurality of components. The plurality of components may further include one or more component types. A second or subsequent business application workflow may be embedded or linked as a component of the first business application workflow. Resource usage information of the plurality of components (including resource usage information of underlying units of work of the plurality of components) may be correlated to determine cumulative resource usage information for the first business application workflow. The resource usage information may be displayed in a graphical user interface. User input may be received indicating one or more of the following for the first business application workflow: an application name, a natural business unit, and a mission-critical ranking.

45 Claims, 7 Drawing Sheets

SYSTEM AND METHOD FOR APPLICATION PERFORMANCE MANAGEMENT

BACKGROUND OF THE INVENTION

1. Field of the Invention

The present invention relates to tracking and planning of business application workflows in an enterprise system, and more particularly to a system and a graphical method for tracking end-to-end computer resource consumption of a business application workflow in an enterprise system.

2. Description of the Related Art

A business application may be viewed directly with an End User perspective, or alternatively viewed indirectly based on computer resource consumption of the corresponding computer programs that deliver the functions to fulfill the goals of the business application.

Examples of the direct view may include: a corporate payroll application, a catalog order application, an insurance claims application, and/or a bank accounts update application. These example business applications have natural business units such as number of employees for the corporate payroll application, number of catalog orders for the catalog order application, number of claims for the insurance claims application, and number of accounts for the bank accounts update application.

In contrast, the computer resource consumption view may be composed of the underlying computer programs for the business application, and the computer resource usage of the underlying computer programs. Typical examples of computer resources may include: CPU usage, I/O activities on various disks and/or other I/O devices (e.g., tapes), database accesses, memory usage, network bandwidth, network latency, and/or other software serialization or synchronization delays. Looking at the computer resource consumption view, the business application is represented piecemeal by a composite group of "units of work" executing in one or more heterogeneous computers that may be linked in a Parallel Sysplex or LAN/WAN network. The most common "units of work" are as follows: processes and threads; program names and executable names; transactions; GroupWare/Middle-Ware; Enterprise Resource Planning (ERP); Customer Relationship Management (CRM); messages; network packets; computer jobs and tasks; performance groups (e.g., for computers running Compatibility Mode under the OS/390 operating system); service class, service class periods, and report classes (e.g., for computers running the Goal Mode under the OS/390 operating system).

Although a business application is typically perceived as a single entity by end users, it may be indirectly represented by a multi-faceted amalgamation of disjointed and heterogeneous computers (possibly running different operating systems and platforms), network links/routers, a diverse group of software constructs and their computer resource consumption. The origin of this indirect view is both historical and out of necessity. Current monitors and capacity planning products are by and large server-centric or network-centric. The data collection process is typically a bottom-up process starting with the kernel of the operating system in each node/system. Thus, during the past two decades, almost all commercially available tools have been server-centric and/or system hardware oriented. While this approach has proven to be very effective for real-time monitors to manage server availability, it falls short in meeting the fundamental requirements for client/server application management tools. One challenge is the arduous task of reconciling the business view with the indirect computer resource view by identifying all the piecemeal (disjoint) computer components (both hardware and software) for the business application. With traditional platform-specific products, each piecemeal component is analyzed individually (typically with each analysis using different tools). The end user typically must manually correlate the individual analysis results to form a business application end-to-end view. This method requires high maintenance, is unscalable, and is error-prone.

A second shortcoming of commercially available server-centric application management tools is the lack of an enterprise application workflow view. This limitation first becomes apparent with the emergence of client/server mission-critical applications. The concern over this shortfall is steadily gaining momentum. The advent of the World Wide Web and the exponential growth of the Internet have brought sweeping changes to Web-enabled mission-critical applications. One of the most distinctive differences between a Web-enabled client/server application and its traditional counterpart is the performance expectation of end users. As dissatisfied consumers are only a "click" away from switching to a business's competitor, it becomes clear that the mantra of successful e-Business applications is the focus on the end user experience. It is inevitable that focusing on the end user experience will change not only the fundamental way corporations do business, but also capacity planning and performance-assurance strategies for Web-enabled applications. An expanded information technology model known as e-transaction processing (first introduced by the IBM e-Business Group) begins to address the growing business need for end-to-end, integrated, and complex solutions. As used herein, e-transaction processing is characterized as the technology infrastructure that enables the transformation and integration of end-to-end business processes using Internet technologies. E-transaction processing is an evolving e-business requirement aimed at providing the highest levels of customer satisfaction. E-transaction processing may exploit new technologies that recognize the heterogeneous nature of any e-business and may provide the means of tying together existing, cross-platform components.

We are at a turning point in computing history. Businesses are rapidly evolving from Online Transaction Processing (OLTP), the widely used computing model that underlies most current mission-critical business applications, to e-transaction Processing, a new model for Web-enabled mission-critical e-business applications.

In a typical OLTP environment (see FIG. 1), multiple disjoint intervention points are involved to coordinate workflow and individual tasks along the path of a complete business transaction. However, in an e-transaction processing model, shown in FIG. 2, all of those individual, separate tasks may be integrated into a streamlined process with less manual intervention. Transaction closure may be reached much faster as customers and businesses are provided with end-to-end "self service" at their convenience. What previously might have involved several different (piecemeal and disjointed) points of intervention, now becomes one seamless business process. The business process must be able to integrate the entire value chain, providing interoperability among heterogeneous systems.

As previously noted, traditional performance management tools are almost always server-centric and track the resource consumption of different components piecemeal. Thus, the burden of managing the single entity of a business application through the eyes of these disjoint piecemeal components is on the end users. Moreover, any capacity-planning "what-if" scenario for the business application can only be indirectly formulated in terms of the individual underlying components. For example, if Corporation ABC is planning to merge with another company, an immediate capacity-planning scenario may likely be: "What is the new performance implication and resource requirements if the corporate Payroll application will grow by 50%?" Without a direct Business Application View and its workflow in traditional server-centric tools, this basic question may only be addressed through an indirect and piecemeal approach. Not only is this a fragmented and labor-intensive process, it seldom delivers the complete answers necessary to meet business needs. Thus, it is desirable to empower the traditional server-centric capacity planning strategy to focus on the end-to-end business application view for e-transaction performance management.

SUMMARY OF THE INVENTION

The present invention provides various embodiments of an improved method and system for application performance management by tracking end-to-end computer resource consumption of a first business application workflow in an enterprise system. The first business application workflow may include a plurality of components. The plurality of components may include one or more of the following component types: transactions, GroupWare/MiddleWare, ERP, CRM, databases, servers, networks, user defined. A second or subsequent business application workflow may be embedded or linked as a component of the first business application workflow, thus promoting online collaboration among various members or departments within an organization. Creation of the first business application workflow may be empowered with this online collaboration approach.

Resource usage information of the plurality of components may be examined. The resource usage information of the plurality of components may be correlated to determine cumulative resource usage information for the first business application workflow. The resource usage information of the plurality of components and the cumulative resource usage information for the first business application workflow may be stored in a memory in response to the correlating. Storing may include storing the resource usage information of the plurality of components and the cumulative resource usage information for the first business application workflow in a database comprised in the memory. The cumulative resource usage information for the first business application workflow may include information regarding the resource usage information of the plurality of components.

The computer resources whose consumption is being tracked may include one or more of the following: CPU usage, I/O activity, database accesses, memory usage, network bandwidth, network latency, software serialization, or synchronization delays. The resource usage information of the plurality of components may include resource usage information of underlying units of work of the plurality of components. The underlying units of work of the plurality of components may include one or more of the following: processes, threads, program names, executable names, transactions, GroupWare, MiddleWare, Enterprise Resource Planning, Customer Relationship Management, messages, network packets, computer jobs, computer tasks, performance groups, service classes, service class periods, or report classes.

One or more reports may be generated using the resource usage information of the plurality of components and the cumulative and/or correlated resource usage information for the first business application workflow. The reports generated using the resource usage information of the plurality of components and the cumulative and/or correlated resource usage information for the first business application workflow may include end-to-end component completion times.

In addition to reporting, "what-if" scenarios may be applied to the business application as a single entity as well as "what-if" scenarios applied to individual components of the business application workflow. The Web based Graphical Wizard used to create the business application workflow may be extended to create a "what-if" scenarios explorer. New reports may be generated as a result of "what-if" scenarios built using the "what-if" scenarios explorer.

User input may be received indicating one or more of the following for the first business application workflow: an application name, a natural business unit, and a mission-critical ranking. The cumulative and/or correlated resource usage information for the first business application workflow may include a sequence of entrances and exits through one or more of the plurality of components. The resource usage information of the plurality of components and the cumulative and/or correlated resource usage information for the first business application workflow may be displayed in a graphical user interface.

BRIEF DESCRIPTION OF THE DRAWINGS

A better understanding of the present invention can be obtained when the following detailed description of various embodiments is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 3:
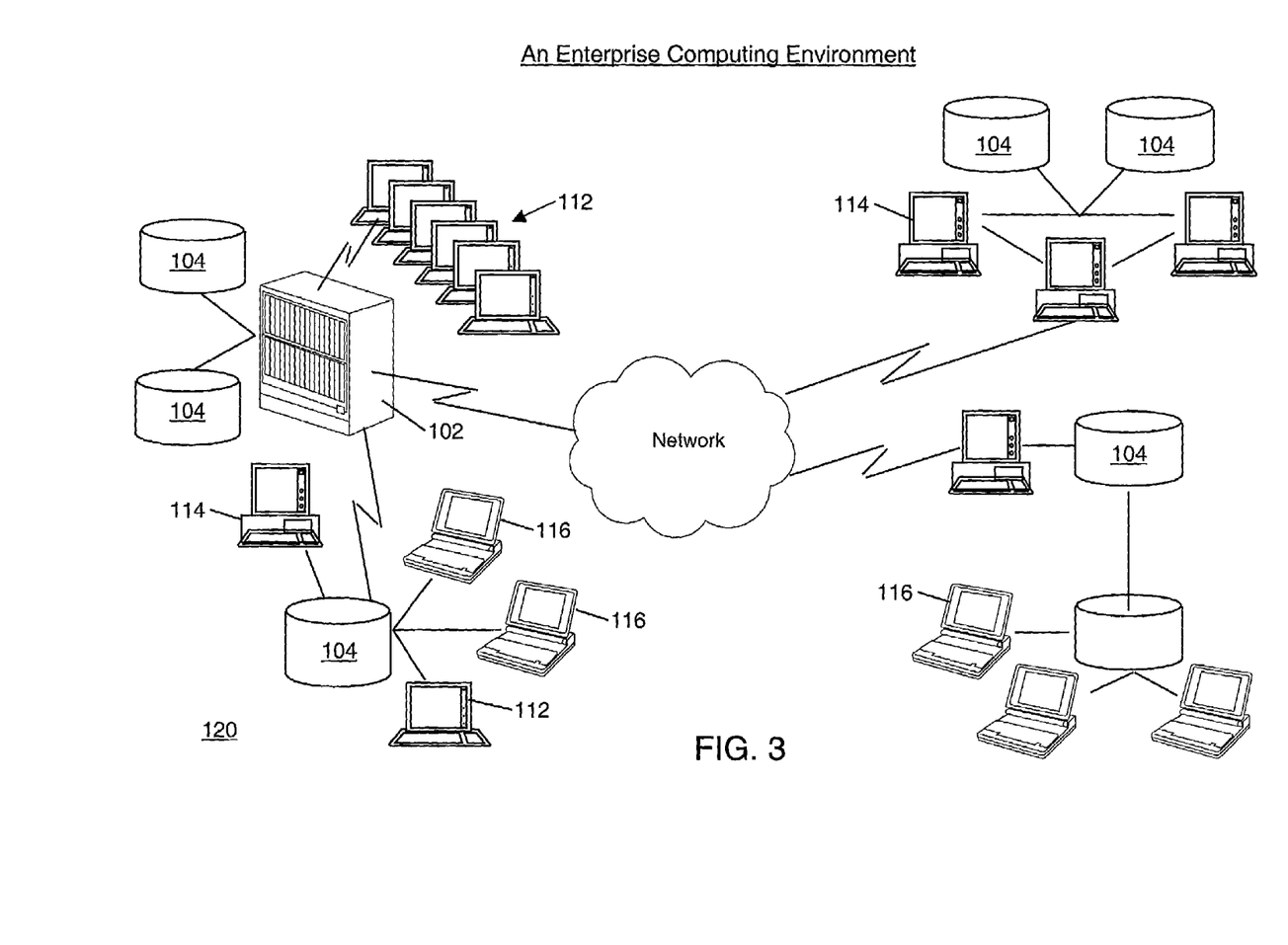
FIG. 3 illustrates an exemplary enterprise computing environment, according to one embodiment.

FIG. 3: An Enterprise Computing Environment

FIG. 3 illustrates an exemplary enterprise or business application computing environment according to one embodiment of the present invention. As shown, the enterprise computing environment may include one or more computers 102, shown as mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 3, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 3, the mainframe computer 102 may also be coupled through a wide area network, represented by the "cloud" in FIG. 3, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art. In a similar manner, each of the desktop computer systems 114 and/or portable computer systems 116, or other computer systems comprised in the enterprise, comprise various standard computer components including one or more CPUs, one or more buses, memory, a power supply and non-volatile memory. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a plurality of components which may be combined into one or more business application workflows, said components may be desired to be accessible among a portion or all of the enterprise, e.g., desired to be accessible by one or more of the computer systems 114 and 116. In one embodiment, the plurality of components stored in the mainframe computer system 102 may be desired to be distributed among one or more of the various file servers 104 connected to the various computer systems 114 and 116. Thus, it may be desired that the plurality of components which may be combined into the one or more business application workflows be distributed among the enterprise for ready access among multiple users.

One embodiment of the present invention preferably comprises application performance management programs stored in the mainframe computer system 102 and/or one or more of the computer systems 114, 116 or 104 which operate to provide various services. According to one embodiment of the present invention, the application performance management programs track end-to-end resource usage information of one or more business application workflows.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory or random access memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software utility program or programs for application performance management as described herein. The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A computer system executing code and data from the memory medium comprises a means for creating and executing the software program or programs according to the methods and/or block diagrams described below.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks 102 and/or 104 and/or a wireless link.

In the preferred embodiment, the present invention comprises one or more software components, preferably a plurality of software components, which operate to provide various application performance management utilities.

Figure 4:
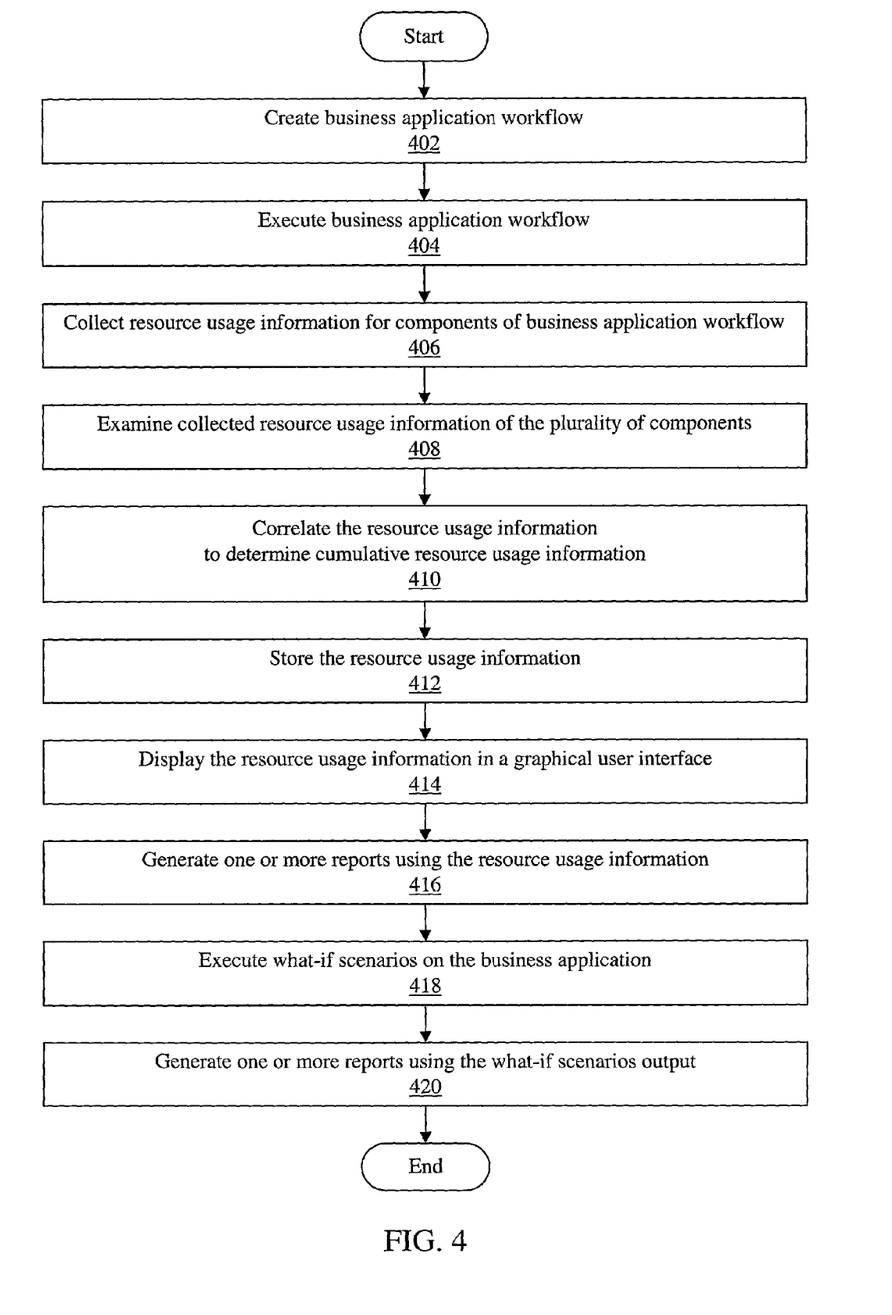
FIG. 4 is a flowchart illustrating an overview of tracking resource usage information for a Business Application Workflow, according to one embodiment.

FIG. 4: Tracking Resource Usage Information of a Business Application Workflow FIG. 4 is a flowchart of an embodiment of a system and method for tracking resource usage information for a Business Application Workflow. As used herein, a "Business Application Workflow" is a series of steps or tasks necessary to produce a specific outcome.

In step 402, a business application workflow may be created using one or more components for the workflow. In one embodiment, header information related to the entire business application, rather than a component of the business application workflow, may be supplied by the user. The header information may include: a business name or name of application (e.g., Catalog Order Sales Application), a natural business unit (e.g., number of orders processed), a mission critical ranking index (e.g., a numerical ranking). It is noted that the mission critical ranking index may be based on varying scales, in addition to, or in place of numerical rankings. Alternate mission critical ranking indexes may include rankings based on an objective (e.g., management focus, revenue). Mission critical ranking differs from the existing practice of ranking individual processes/transactions/files across heterogeneous platforms. The existing practice of ranking individual processes/transactions/files may result in arbitrary, unscalable solutions.

Role-based scorecard reports may be developed as part of the mission critical ranking index. Examples of roles may include any role within the organization (e.g., executives of the corporation/entity, customer service representatives, system administrators, DBAs, Capacity Planners, among others).

In one embodiment, the business application workflow may be easily and intuitively created based on a graphical user interface (e.g., a Web based Graphical Business Application Workflow Wizard) using drag-and-drop technology. Users may create each component of the flow transition diagram simply by "dragging-and-dropping" a component template from the Business Workflow Component Container. An END component template may be used to indicate that the workflow for the business application is completed.

Figure 5:
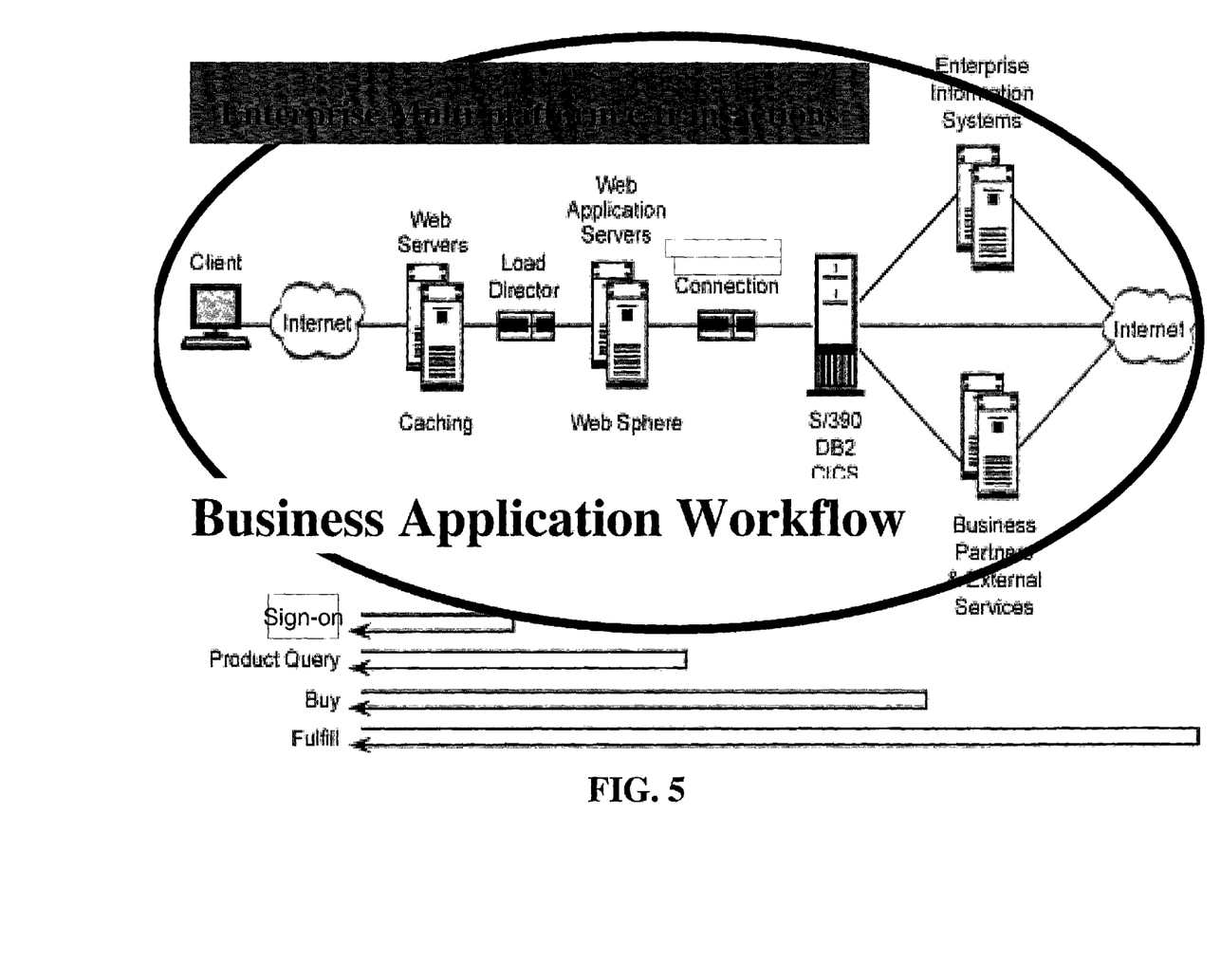
FIG. 5 is a flowchart illustrating a Business Application Workflow, according to one embodiment.

In step 404, the business application workflow may be executed, as further described in FIG. 5. In step 406, resource usage information for components of the business application workflow may be collected. Details regarding various component types is further described in FIG. 5.

In step 408, the collected resource usage information of the plurality of components may be examined or tracked by the application performance management programs. In one embodiment, conventional agent technology may be used to examine or track the collected resource usage information of the plurality of components. The collected resource usage information of the plurality of components may then be automatically sent to a Web portal using Web services. The collected resource usage information of the plurality of components may be transmitted as XML files for purposes of universal data exchange. For more information on the use of agent technology to track or acquire the collected resource usage information of the plurality of components, please see U.S. Pat. No. 5,655,081, titled "System for Monitoring and Managing Computer Resources and Applications Across a Distributed Environment Using an Intelligent Autonomous Agent Architecture".

In step 410, the resource usage information may be correlated to determine cumulative resource usage information for the entire business application workflow. The cumulative resource usage information may take into account each of the components of the business application workflow. For example, in a simple business application workflow, where each component is processed serially, the correlation process may simply add up the resource usage information for each individual component in the simple business application workflow to arrive at the cumulative resource usage information for the entire business application workflow.

In a more complicated business application workflow example, involving probabilistic branching, the correlating equation may take into account the probability or weight of each branch and may multiply that probability by the resource usage information for the individual component. The probability of each branch may be determined in a number of ways (e.g., evenly distributed across all branches, distributed based on transaction volumes or some other measure, or a user specified distribution of probabilities). The probability assigned to serial components is 1, thus serial components may follow the same pattern as branching components i.e., (probability)*(individual component's resource usage information).

In step 412, the resource usage information may be stored (e.g., in a centralized database on the Web portal). Storage of the data enables subsequent reporting and "what-if" scenario building, utilizing the stored data.

In step 414, the resource usage information may be displayed in a graphical user interface. The display graphical user interface may be the same graphical user interface used for creating the business application workflow, or it may be a separate graphical user interface.

In step 416, one or more reports using the resource usage information may be generated. Various reports based on component type may be generated. User-configurable reports may also be generated on demand.

In addition to reporting, "what-if" scenarios may be executed or applied to the business application, as shown in step 418. The "what-if" scenarios may be applied to the business application as a single entity, as well as "what-if" scenarios applied to individual components of the business application workflow. The Web based Graphical Wizard used to create the business application workflow may be extended to create a "what-if" scenarios explorer.

In step 420, additional reports may be generated as a result of "what-if" scenarios built using the "what-if" scenarios explorer. Reports based on information in a "what-if" scenario may be useful for planning purposes.

FIG. 5: Business Application Workflow

The plurality of computer systems illustrated in FIG. 3 are shown in a different format in FIG. 5, as a distributed client/server system. A business application workflow may execute in the distributed client/server system described in FIG. 5. Various resource usage information for each component or step within the business application workflow may be collected, as the business application workflow executes.

As shown in FIG. 5, a Business Application Workflow of a single business application may include: multiple platforms, multiple tiers (e.g., processing in serial, processing in parallel, forks/joins, probabilistic branching), multiple component types (e.g., transactions, databases, servers, networks).

As noted earlier, components may be of various types (e.g., transactions, databases, servers, networks). The underlying computer components and workflow may vary, based on the component type. For each component type, the user may have the ability to "drill" down the hierarchy of the component type for purposes of obtaining reports and/or graphics (e.g., total application response time with "drill" down to retrieve response times of individual components; response time component analysis), for Online Application Processing (OLAP) exploration, and/or for "what-if" scenarios, among other reasons.

For example, for a server component type, the underlying computer components and workflow may include: server name (i.e., server name, IP address, host name), server platform (e.g., OS/390, z/OS, Unix, NT, AS/400, OpenVMS, Tandem, etc.), workflow software composites. Each software composite may include: software application name, process name, or executable name; percentage dedicated to the business application (e.g., usage, determined by a single method: by CPU consumption in percentage of the total server CPU consumption; by CPU consumption in MIPS or Spec-Ints or TPMs or some other measure; by selecting one or more transactions or workloads from the chosen server);

number of calls issued on behalf of the business application or group of transactions; based unit costing for chargeback and accounting; resource usage for CPU, I/O, memory and other delays; among others.

For a database component type, the underlying computer components and workflow may include: database name, database platform (e.g., OS/390, z/OS, Unix, NT, AS/400, OpenVMS, Tandem, etc.), workflow software composites. Each software composite may include: software application name, process name, or executable name; percentage dedicated to the business application (e.g., usage, determined by a single method: by consumption in percentage of the total database CPU consumption; by consumption in MIPS or Spec-Ints or TPMs or some other measure; by selecting one or more transactions or workloads from the chosen database); number of calls issued on behalf of the business application or group of transactions; based unit costing for chargeback and accounting; resource usage for CPU, I/O, memory and other delays; among others.

For a network component type, the underlying computer components and workflow may include: network type (e.g., LAN, WAN, Internet, etc.), component name (e.g., router, hub, network "cloud", user defined), workflow software composites. Each software composite may include: software application name, process name, or executable name; network latency or delay (e.g., fixed delay, or variable delay based on time of day or day of week); among others.

For a user defined "blackbox" or "cloud" component type, the underlying computer components and workflow may include: descriptive name, aggregate latency or delay (e.g., fixed delay, or variable delay based on time of day or day of week); among others. Possible reasons for a user creating a user defined "blackbox" or "cloud" component type may include: data not yet available; user lacks domain knowledge; think time.

For a previously defined business application workflow component type to be included in a second, different business application workflow component, the previously defined business application workflow component type must exist in a shared space (e.g., a file folder). Additionally, the second, different business application workflow component may specify the method of connecting to the previously defined business application workflow component type (e.g., embedded or linked). The second, different business application workflow may be embedded or linked as a component of the previously defined business application workflow, thus promoting online collaboration among various members or departments within an organization (see FIG. 6 for more details regarding online collaboration). Creation of the previously defined business application workflow may be empowered with this online collaboration approach.

The embedded method may result in a copy of the previously defined business application workflow component type being placed within, or local to, the second, different business application workflow component. The linked method may result in any future changes to the previously defined business application workflow component type being dynamically reflected in the second, different business application workflow component. The linked method may allow for read-only linking or read-write linking. Read-only linking may indicate that the second, different business application workflow component has read-only access to the linked previously defined business application workflow component type, and thus may not make changes to the previously defined business application workflow component type. Read-write linking may indicate that the second, different business application workflow component has both read access and write access to the linked previously defined business application workflow component type, and thus may make changes that affect all other business application workflow component linked to the previously defined business application workflow component type.

Figure 6:
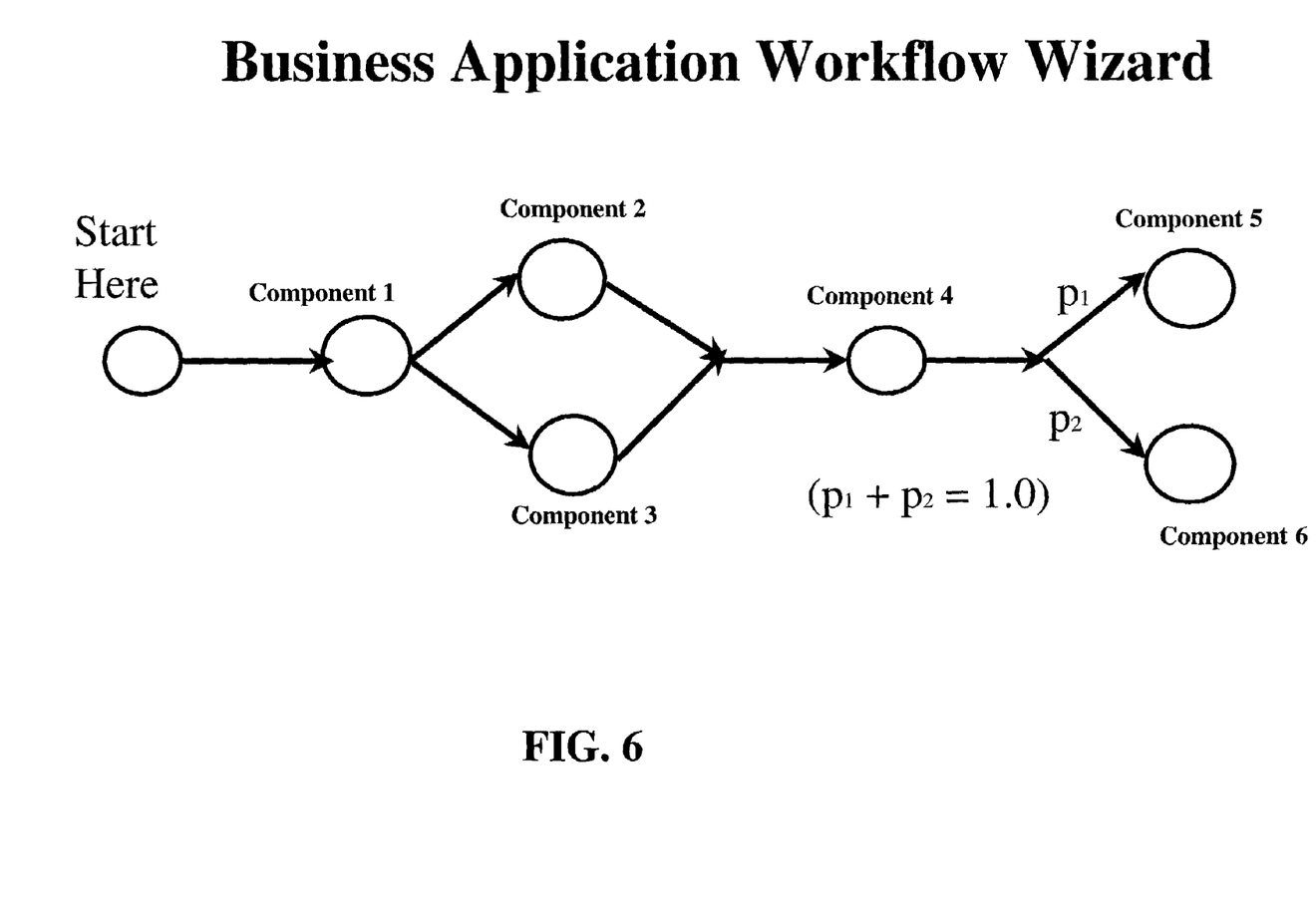
FIG. 6 is a flowchart illustrating multiple components of a Business Application Workflow, according to one embodiment.

FIG. 6: Multiple Components of a Business Application Workflow

As shown in FIG. 6, a Business Application Workflow of a single business application may include multiple components (e.g., transactions, databases, servers, network components, user defined "blackbox" or "cloud" components, previously defined business application components). A component may be a group of transactions in a server (running on any computing platform), part of a server (e.g., 30% of server1), part of a database, a network router, or a customer defined aggregate delay, among others.

Previously defined business application components may be shared among multiple business application workflows. Benefits of sharing previously defined business application components may include, but are not limited to, the ability to: nest business application workflows, create complex business application workflows, create scalable business application workflows, "roll-up" business application workflows, create tiers, create composites, support sharing of domain/platform knowledge.

It is noted that each component (i.e., component 1 or C1 through component 6 or C6) is a building block with its own icon. The "Total Response Time" for the business application may be computed as a sum of each of the component response times. For example: C1+Max(C2, C3)+C4+p1 (C5)+p2(C6).

Each component shown in FIG. 6 represents an abstract component of a business application workflow. A component may be referred to as a "flow transition" or a "hop" of the business application workflow. In a graphical user interface, (e.g., the Web based Graphical Business Application Workflow Wizard shown in FIG. 6) a business application workflow transition may be defined by selecting a transition layout by using drag-and-drop from a Business Application Workflow (BAW) Transition Container. Example transition layouts may include: serial, triggers: asynchronous, triggers: synchronous, and branching. Each transition layout may include one or more components.

A user may select a component by using drag-and-drop from a BAW Component Container. Example components may include: serial: one component only; triggers: two or more components selected; branching: two or more components selected with each component having a branching probability (the branching probability may be evenly distributed across all branches by default, or the user may assign alternate values for the branching probabilities for each component). As shown, component 1 and component 4 are examples of serial components; component 2 and component 3 are examples of trigger components; and component 5 and component 6 are examples of branching components. Upon component selection, the Web based Graphical Business Application Workflow Wizard may prompt the user for relevant input regarding the selected component (e.g., underlying computer components and workflow, as discussed in FIG. 5).

In one embodiment, when a user defines a Business Application Workflow of a business application the user may choose to start off with a macro or high level view and iteratively augment the workflow over time, as more detailed data for finer granularity becomes available regarding the workflow and/or the user is presented with shared domain/platform knowledge from other users or other workflows. Sharing of domain/platform knowledge may be referred to as on-line collaboration. Creating complex workflows using modular building-block workflows may allow for scalable, pragmatic workflows that may be completed more quickly than workflows that have no shared data. Domain expertise may be effectively shared (i.e., on-line collaboration) by having various expert users each build sub-components related to their knowledge base. The scalability of using sub-components may be enhanced when the complexity of each sub-component is kept to a minimum.

Scalability of business application workflows may be greatly enhanced by sharing previously defined business application components, created by various members or departments within an organization. Different components of a complex integrated business application are typically very diverse in nature, thus certain components may require domain expertise to select appropriate representations of the components. Through the use of on-line collaboration to build individual components, an organization may fully utilize the wide range of domain expertise that may be found within the organization. On-line collaboration may also be viewed as a divide-and conquer approach that is both scalable and pragmatic.

Figure 7:
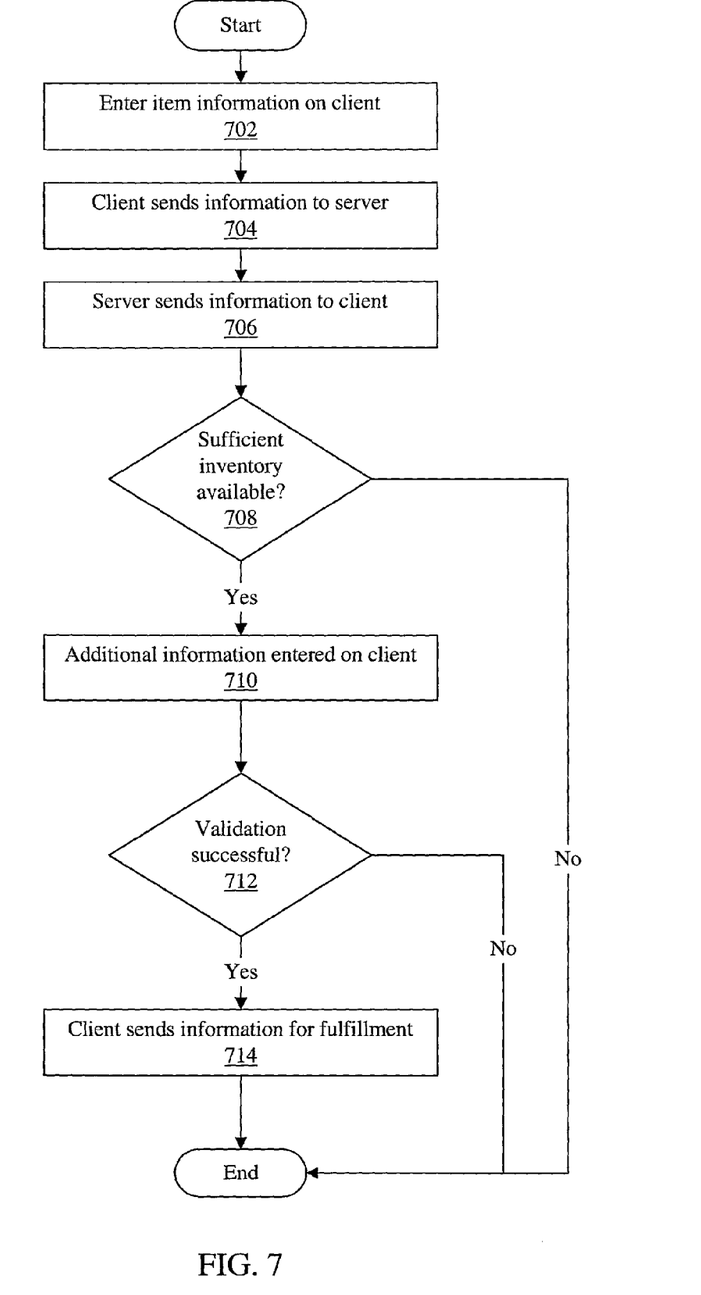
FIG. 7 is a flowchart illustrating an example Business Application Workflow, according to one embodiment.

FIG. 7: Example Business Application Workflow

Figure 1:
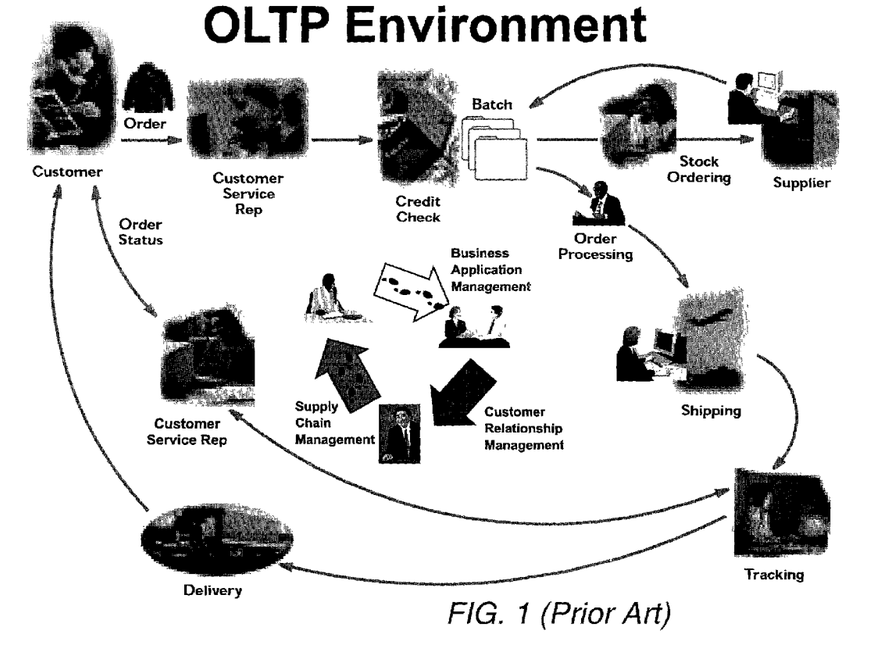
FIG. 1 illustrates a typical Online Transaction Processing environment.
Figure 2:
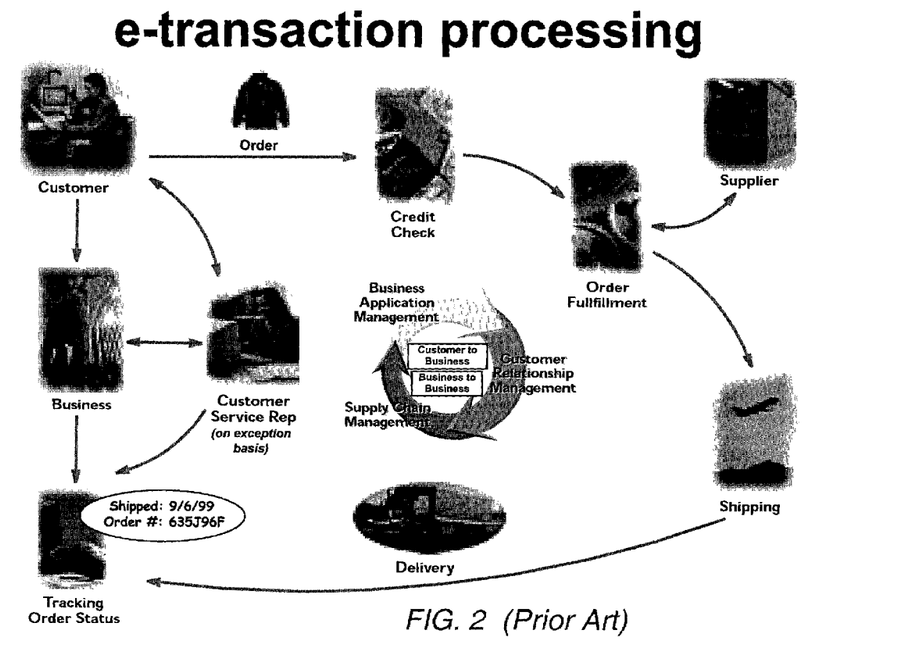
FIG. 2 is a flowchart illustrating an e-transaction Processing environment.

The workflow description shown in FIG. 7 follows closely that of a typical OLTP system as shown in FIG. 1. Moreover, the FIG. 7 workflow description captures the essence of a distributed client/server system, particularly a Web-enabled e-business application as illustrated in FIG. 2. A typical business application workflow is beyond server-centric or network-centric. A typical business application workflow may span multiple platforms and may be supported by a number of heterogeneous computer software processes and transactions.

For many retail stores, catalog sales orders are a mission critical business application. For example, consider the business application workflow for catalog sales order taking for a retail store. As shown in step 702, a customer service representative may take catalog orders from customers over a telephone. The customer service representative may enter the customer order requests via a first Windows NT application.

In step 704, the first Windows NT application may send the customer order request to a second Unix application. The second Unix application may check inventory for availability of the items in the customer order (e.g., checking inventory data stored in an Oracle database). Note that the Windows NT workstation may be connected to the Unix server over WAN network links with multiple network routers in between. Furthermore, there may be at least two separate processes involved once the Windows NT request reaches the Unix server; namely the inventory check application and accessing of the Oracle server for data.

In step 706, the Unix inventory check application may send an answer back to the requester on the Windows NT workstation, indicating the availability of the requested items.

In step 708, the answer returned from the Unix inventory check application may be reviewed to determine if sufficient inventory exists to fulfill the customer order. If the order may not be fulfilled, processing may end. Otherwise, processing may continue with step 710.

In step 710, the customer service representative may enter additional customer information (e.g., billing and/or shipping addresses, credit card information) on the Windows NT workstation. In one embodiment, a connection may be established to another Unix node (across the network) to validate the credit card information.

In step 712, the answer returned from the Unix credit card validation check application may be reviewed to determine if the customer credit card is approved. If the validation fails, processing may end. Otherwise, processing may continue with step 714.

In step 714, the customer service representative may proceed to the final stage of the customer order by connecting to the backend over WAN links. In one embodiment, the backend may be supported by a CICS on-line transaction application and may access a DB2 database for data.

Applying the business application workflow schema (discussed under FIG. 5 above) to the catalog order sale application as outlined above, the workflow profile may appear as follows: business name: catalog order sales application, SALE; natural business units: number of catalog orders processed; underlying computer components and workflow:

| Server S1 | Platform NT | <NT Process ID> | 100% |
| Server S2 | Platform Unix | <Unix Process ID> | 100% |
| Server S2 | Platform Unix | Oracle_for_SALE | 30% |
| Server S3 | Platform Unix | <Unix Process ID> | 100% |
| Server S4 | Platform OS/390 | CICS for SALE | All trans. ABC*> |
| Server S4 | Platform OS/390 | DB2_for_SALE | 10 SQL calls |

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A computer executed method of tracking resource usage information in an enterprise system having system components, the method comprising:

creating a first graphical workflow in a graphical user interface by interconnecting graphical components with graphical transitions between the graphic components, the graphical components representing system components associated with a first business application executing on the enterprise system, the transitions representing flow of work between interconnected system components, wherein the first graphical workflow includes at least two branching components;

assigning a probability of flow of work to one of the branching components that is not equal to probabilities assigned to the other branching components;

collecting resource usage information from one or more of the system components associated with the first business application;

correlating by computer computation the resource usage information to determine cumulative resource usage information for the first business application by using mathematical relationships associated with the graphical components and the transitions in the first graphical workflow; and storing the resource usage information and the cumulative resource usage information in a memory.

2. The method of claim 1, wherein resources for which resource usage information is collected, correlated, and stored, comprises one or more of the following: CPU usage, I/O activity, database accesses, memory usage, network bandwidth, network latency, software serialization, or synchronization delays.

3. The method of claim 1, wherein the resource usage information comprises underlying units of work of the plurality of system components.

4. The method of claim 3, wherein the units of work comprise one or more of the following: processes, threads, program names, executable names, transactions, Group-Ware, MiddleWare, Enterprise Resource Planning, Customer Relationship Management, messages, network packets, computer jobs, computer tasks, performance groups, service classes, service class periods, or report classes.

5. The method of claim 1, wherein the plurality of graphic components comprises one or more of the following: transactions, databases, servers, networks, and user defined types of system components.

6. The method of claim 5, further comprising:
embedding or linking a second graphical workflow that graphically represents a second business application as a graphical component of the first graphic workflow of the first business application;
wherein said correlating further comprises adding by computer computation the resource usage information for the embedded or linked second graphical workflow to the resource usage information for the first graphical workflow.

7. The method of claim 1, further comprising generating one or more reports using the resource usage information and the cumulative resource usage information.

8. The method of claim 7, wherein the reports include end-to-end system component completion times.

9. The method of claim 1, wherein the cumulative resource usage information comprises a sequence of entrances and exits through one or more of the system components.

10. The method of claim 1, further comprising displaying the resource usage information and the cumulative resource usage information in the graphical user interface.

11. The method of claim 1, wherein said storing comprises storing the resource usage information and the cumulative resource usage information in a database comprised in the memory.

12. The method of claim 1, further comprising:
creating a plurality of graphical workflows;
receiving user input indicating a ranking for each business application graphically represented by the graphical workflows; and
sorting the graphical workflows based on the rankings to construct a hierarchy of business applications graphically represented by the graphical workflows.

13. The method of claim 1, wherein creating the first graphical workflow comprises one or more of:
adding a serial component to the first graphical workflow, the serial component having first and second transitions, the first transition interconnecting the serial component to a first component on an input side of the serial component, the second transition interconnecting the serial component to a second component on and an output side of the serial component;
adding first and second trigger components to the first graphical workflow, each of the first and second trigger components having a first transition interconnected to a same first component on an input side of the each of the first and second trigger components and having a second transition interconnected to a same second component on an output side of the each of the first and second trigger components; and
adding two or more branching components to the first graphical workflow, each of the two or more branching components having a transition interconnected to a same component on an input side of the each of the two or more branching components.

14. The method of claim 13, wherein creating the first graphical workflow comprises assigning each of the graphical components with a probability of flow of work associated with each of the system components represented by the each of the graphical components, and wherein correlating by computer computation comprises multiplying collected resource usage information of a given one of the system components represented by a given one of the graphical components by the assigned probability of flow of work associated with that given one of the system components.

15. The method of claim 13, further comprising assigning the first and second trigger components as asynchronous or synchronous.

16. A system for tracking resource usage information in an enterprise system having system components, the system comprising:
a CPU; and
a memory medium coupled to the CPU which stores a resource usage tracking program, wherein the resource usage tracking program is executable to:
create a first graphical workflow in a graphical user interface by interconnecting graphical components with graphical transitions between the graphic components, the graphical components representing system components associated with a first business application executing on the enterprise system, the transitions representing flow of work between interconnected system components, wherein the first graphical workflow includes at least two branching components;
assign a probability of flow of work to one of the branching components that is not equal to probabilities assigned to the other branching components;
collect resource usage information from one or more of the system components associated with the first business application graphically represented by the first graphical workflow;
correlate by computer computation the resource usage information to determine cumulative resource usage information for the first business application by using mathematical relationships associated with the graphical components and the transitions in the first graphical workflow; and
store the resource usage information and the cumulative resource usage information in a memory.

17. The system of claim 16, wherein resources for which resource usage information is collected, correlated, and stored, comprises one or more of the following: CPU usage, I/O activity, database accesses, memory usage, network bandwidth, network latency, software serialization, or synchronization delays.

18. The system of claim 16, wherein the resource usage information comprises underlying units of work of the plurality of system components.

19. The system of claim 18, wherein the units of work comprise one or more of the following: processes, threads, program names, executable names, transactions, Group-Ware, MiddleWare, Enterprise Resource Planning, Customer Relationship Management, messages, network packets, computer jobs, computer tasks, performance groups, service classes, service class periods, or report classes.

20. The system of claim 16, wherein the plurality of graphical components comprises one or more of the following: transactions, databases, servers, networks, and user defined types of system components.

21. The system of claim 20, wherein the program is executable to:
embed or link a second graphical workflow that graphically represents a second business application as a graphical component of the first graphical workflow of the first business application;
wherein to correlate, the program is executable to add by computer computation the resource usage information for the embedded or linked second graphic workflow to the resource usage information for the first graphical workflow.

22. The system of claim 16, wherein the program is executable to generate one or more reports using the resource usage information and the cumulative resource usage information.

23. The system of claim 22, wherein the reports include end-to-end system component completion times.

24. The system of claim 16, wherein the cumulative resource usage information comprises a sequence of entrances and exits through one or more of the system components.

25. The system of claim 16, wherein the program is executable to display the resource usage information and the cumulative resource usage information in the graphical user interface.

26. The system of claim 16, wherein to store, the program is executable to store the resource usage information and the cumulative resource usage information in a database comprised in the memory.

27. The system of claim 16, wherein the program is executable to create a plurality of graphical workflows;
receive user input indicating a ranking for each business application graphically represented by the graphical workflows; and
sort the graphical workflows based on the rankings to construct a hierarchy of business applications graphically represented by the graphical workflows.

28. The system of claim 16, wherein to create the first graphical workflow, the resource usage tracking program is executable to perform one or more of:
add a serial component to the first graphical workflow, the serial component having first and second transitions, the first transition interconnecting the serial component to a first component on an input side of the serial component, the second transition interconnecting the serial component to a second component on an output side of the serial component;
add first and second trigger components to the first graphical workflow, each of the first and second trigger components having a first transition interconnected to a same first component on an input side of the each of the first and second trigger components and having a second transition interconnected to a same second component on an output side of the each of the first and second trigger components; and
add two or more branching components to the first graphical workflow, each of the two or more branching components having a transition interconnected to a same component on an input side of the each of the two or more branching components.

29. The system of claim 28, wherein correlating by computer computation comprises multiplying collected resource usage information associated with a given one of the system components represented by a given one of the graphical components by the assigned probability of flow of work for that given one of the system components.

30. The system of claim 28, wherein the resource usage tracking program is executable to assign the first and second trigger components as asynchronous or synchronous.

31. A programmable storage device which stores program instructions for tracking resource usage information in an enterprise system having system components, wherein the program instructions are executable to implement:
creating a first graphical workflow in a graphical user interface by interconnecting graphical components with graphical transitions between the graphic components, the graphical components representing system components associated with a first business application executing on the enterprise system, the transitions representing flow of work between interconnected system components, wherein the first graphical workflow includes at least two branching components;
assigning a probability of flow of work to one of the branching components that is not equal to probabilities assigned to the other branching components;
collecting resource usage information from one or more of the system components associated with the first business application graphically represented by the first graphical workflow;
correlating by computer computation the resource usage information to determine cumulative resource usage information for the first business application by using mathematical relationships associated with the graphical components and the transitions of the first graphical workflow; and
storing the resource usage information and the cumulative resource usage information in a memory.

32. The programmable storage device of claim 31, wherein resources for which resource usage information is collected, correlated, and stored, comprises one or more of the following: CPU usage, I/O activity, database accesses, memory usage, network bandwidth, network latency, software serialization, or synchronization delays.

33. The programmable storage device of claim 31, wherein the resource usage information comprises underlying units of work of the plurality of system components.

34. The programmable storage device of claim 33, wherein the units of work comprise one or more of the following: processes, threads, program names, executable names, transactions, GroupWare, MiddleWare, Enterprise Resource Planning, Customer Relationship Management, messages, network packet, computer jobs, computer tasks, performance groups, service classes, service class periods, or report classes.

35. The programmable storage device of claim 31, wherein the plurality of graphical components comprises one or more of the following: transactions, databases, servers, networks, and user defined types of system components.

36. The programmable storage device of claim 35, wherein the program instructions are executable to implement:

embedding or linking a second graphical workflow that graphically represents a second business application as a graphical component of the first graphic workflow of the first business application;

wherein said correlating further comprises adding by computer computation the resource usage information for the embedded or linked second graphic workflow to the resource usage information for the first graphical workflow.

37. The programmable storage device of claim 31, wherein the program instructions are executable to implement generating one or more reports using the resource usage information and the cumulative resource usage information.

38. The programmable storage device of claim 37, wherein the reports include end-to-end system component completion times.

39. The programmable storage device of claim 31, wherein the cumulative resource usage information comprises a sequence of entrances and exits through one or more of the system components.

40. The programmable storage device of claim 31, wherein the program instructions are executable to implement displaying the resource usage information and the cumulative resource usage information in the graphical user interface.

41. The programmable storage device of claim 31, wherein said storing comprises storing the resource usage information and the cumulative resource usage information in a database comprised in the memory.

42. The programmable storage device of claim 31, wherein the program instructions are executable to implement:

creating a plurality of graphical workflows;

receiving user input indicating a ranking for each business application graphically represented by the graphical workflows; and sorting the graphical workflows based on the rankings to construct a hierarchy of business applications graphically represented by the graphical workflows.

43. The programmable storage device of claim 31, wherein to create the first graphical workflow, wherein the program instructions are executable to implement one or more of:

add a serial component to the first graphical workflow, the serial component having first and second transitions, the first transition interconnecting the serial component to a first component on an input side of the serial component, the second transition interconnecting the serial component to a second component on an output side of the serial component;

add first and second trigger components to the first graphical workflow, each of the first and second trigger components having a first transition interconnected to a same first component on an input side of the each of the first and second trigger components and having a second transition interconnected to a same second component on an output side of the each of the first and second trigger components; and add two or more branching components to the first graphical workflow, each of the two or more branching components having a transition interconnected to a same component on an input side of the each of the two or more branching components.

44. The programmable storage device of claim 43, wherein correlating by computer computation comprises multiplying collected resource usage information for a given one of the system components represented by a given one of the graphical components by the assigned probability of flow of work for that given one of the system components.

45. The programmable storage device of claim 43, wherein the program instructions are executable to assign the first and second trigger components as asynchronous or synchronous.

* * * * *